United States Patent
Ko

(10) Patent No.: US 7,421,622 B2
(45) Date of Patent: *Sep. 2, 2008

(54) RECORDING MEDIUM FOR STORING START POSITION INFORMATION FOR EACH ZONE AND METHOD OF MANAGING DATA USING THE INFORMATION

(75) Inventor: Jung-wan Ko, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,120

(22) Filed: May 9, 2006

(65) Prior Publication Data

US 2006/0206765 A1 Sep. 14, 2006

Related U.S. Application Data

(63) Continuation of application No. 10/681,250, filed on Oct. 9, 2003, which is a continuation of application No. 09/474,748, filed on Dec. 29, 1999, now Pat. No. 6,725,400.

(30) Foreign Application Priority Data

Dec. 30, 1998 (KR) .................................. 98-61603

(51) Int. Cl.
*G06F 11/00* (2006.01)
(52) U.S. Cl. .................... 714/42; 714/710; 711/112
(58) Field of Classification Search .................... 714/42, 714/4, 710; 711/112
See application file for complete search history.

(56) References Cited

U.S. PATENT DOCUMENTS 4,949,323 A 8/1990 Yoshida (Continued)

FOREIGN PATENT DOCUMENTS

EP 350920 A2 1/1990

(Continued)

OTHER PUBLICATIONS

Satoh et al, "Key Technology for High Density Rewriteable DVD (DVD-RAM)", IEEE Transactions of Magnetics, vol. 32 No. 2, 1998, pp. 337-342.*

(Continued)

*Primary Examiner*—Emerson C Puente
(74) *Attorney, Agent, or Firm*—Stein, McEwen & Bui, LLP

(57) ABSTRACT

A recording medium for storing start position information for each zone and a method of managing data using the information. In a disc having a plurality of zones which form a group, and a spare area which is allocated at the start portion or the end portion of the group for replacing defects, when start logical sector numbers of each zone are changed by slipping replacement during initialization or reinitialization, the information is stored in the defect management area to thereby increase the compatibility of the medium. In particular, by the method of managing data using information stored in a defect management area, generation of errors is prevented in reading or writing due to the change of a physical position of a real-recorded file which are caused by wrong calculation of the start logical sector numbers for each zone.

19 Claims, 5 Drawing Sheets

U.S. PATENT DOCUMENTS

| | | | |
|---|---|---|---|
| 5,134,499 | A | 7/1992 | Sata et al. |
| 5,212,682 | A | 5/1993 | Sakurai |
| 5,271,018 | A | 12/1993 | Chan |
| 5,319,627 | A | 6/1994 | Shinno et al. |
| 5,335,213 | A | 8/1994 | Fukumoto et al. |
| 5,392,265 | A | 2/1995 | Takezawa |
| 5,475,669 | A | 12/1995 | Yamamoto |
| 5,568,467 | A | 10/1996 | Inagaki et al. |
| 5,613,112 | A | 3/1997 | Nagashima |
| 5,745,453 | A | 4/1998 | Ikeda |
| 5,764,881 | A | 6/1998 | Yoshida |
| 5,768,044 | A | 6/1998 | Hetzler et al. |
| 5,822,284 | A | 10/1998 | Nishizawa |
| 5,903,404 | A | 5/1999 | Tsurumi et al. |
| 5,963,522 | A | 10/1999 | Yamamuro |
| 6,014,363 | A * | 1/2000 | Nakamura et al. ....... 369/275.1 |
| 6,014,754 | A | 1/2000 | Yamada |
| 6,108,158 | A | 8/2000 | Katayama et al. |
| 6,189,110 | B1 | 2/2001 | Saitoh et al. |
| 6,189,118 | B1 | 2/2001 | Sasaki et al. |
| 6,279,118 | B1 | 8/2001 | Kang |
| 6,298,033 | B1 | 10/2001 | Tanoue et al. |
| 6,339,571 | B1 | 1/2002 | Torazawa et al. |
| 6,373,800 | B1 | 4/2002 | Takahashi |
| 6,385,736 | B1 | 5/2002 | Jeong et al. |
| 6,385,744 | B1 | 5/2002 | Ando et al. |
| 6,469,978 | B1 | 10/2002 | Ohata et al. |
| 6,658,588 | B1 | 12/2003 | Ko |
| 6,658,593 | B1 | 12/2003 | Ko |
| 6,725,400 | B1 | 4/2004 | Ko |
| 6,742,147 | B1 | 5/2004 | Sasaki et al. |
| 6,918,004 | B2 * | 7/2005 | Park et al. ................... 714/710 |
| 6,957,360 | B2 | 10/2005 | Sims et al. |
| 7,058,852 | B2 * | 6/2006 | Sims et al. ..................... 714/8 |
| 7,076,701 | B2 * | 7/2006 | Ko ............................. 714/710 |
| 7,210,067 | B2 | 4/2007 | Ko |
| 2001/0002488 | A1 | 5/2001 | Sims et al. |
| 2002/0111957 | A1 | 8/2002 | Kimura et al. |
| 2003/0048731 | A1 | 3/2003 | Ozaki |

FOREIGN PATENT DOCUMENTS

| | | | |
|---|---|---|---|
| EP | 357049 | A2 | 3/1990 |
| EP | 0 440 413 | A2 | 8/1991 |
| EP | 541219 | A1 | 5/1993 |
| EP | 0 798 711 | | 10/1997 |
| EP | 0 866 456 | A1 | 9/1998 |
| JP | 60-007644 | | 1/1985 |
| JP | 62-028976 | | 2/1987 |
| JP | 02-165473 | | 6/1990 |
| JP | 5-217298 | | 8/1993 |
| JP | 8-129835 | | 5/1996 |
| JP | 09-017162 | | 1/1997 |
| JP | 10-285518 | | 10/1998 |
| JP | 11-328930 | | 11/1999 |

OTHER PUBLICATIONS

U.S. Appl. No. 10/681,250, filed Oct. 2003, Jung-wan Ko, Samsung Electronics Co., Ltd.
U.S. Appl. No. 10/681,180, filed Oct. 2003, Jung-wan Ko, Samsung Electronics Co., Ltd.
U.S. Appl. No. 10/681,131, filed Oct. 2003, Jung-wan Ko, Samsung Electronics Co., Ltd.
U.S. Appl. No. 11/302,168, filed Dec. 2005, Jung-wan Ko, Samsung Electronics Co., Ltd.
Office Action issued by European Patent Office in European Patent Application No. 99310093.2-2223 on Nov. 24, 2006.
Search Report issued by Malaysian Patent Office in Malaysian Patent Application No. PI 20024472 on Dec. 19, 2007.
Communication issued May 14, 2007 by the European Patent Office re: European Application No. 99 310 093.2 - 1247 (3 pp).
Search Report and Written Opinion issued by Austrian Patent Office in Austrian Patent Application No. 200504757-6 on Jul. 5, 2007.
U.S. Appl. No. 12/020,175, filed Jan. 25, 2008, Jung-wan Ko, Samsung Electronics Co., Ltd.
U.S. Appl. No. 12/015,805, filed Jan. 17, 2008, Jung-wan Ko, Samsung Electronics Co., Ltd.
U.S. Appl. No. 12/015,766, filed Jan. 17, 2008, Jung-wan Ko, Samsung Electronics Co., Ltd.
U.S. Appl. No. 11/695,909, filed Apr. 3, 2007, Jung-wan Ko, Samsung Electronics Co., Ltd.
U.S. Appl. No. 12/020,175, filed Jan. 25, 2008, Jung-wan Ko, Samsung Electronics Co., Ltd.
U.S. Appl. No. 12/041,831, filed Mar. 4, 2008, Jung-wan Ko, Samsung Electronics Co., Ltd.

* cited by examiner

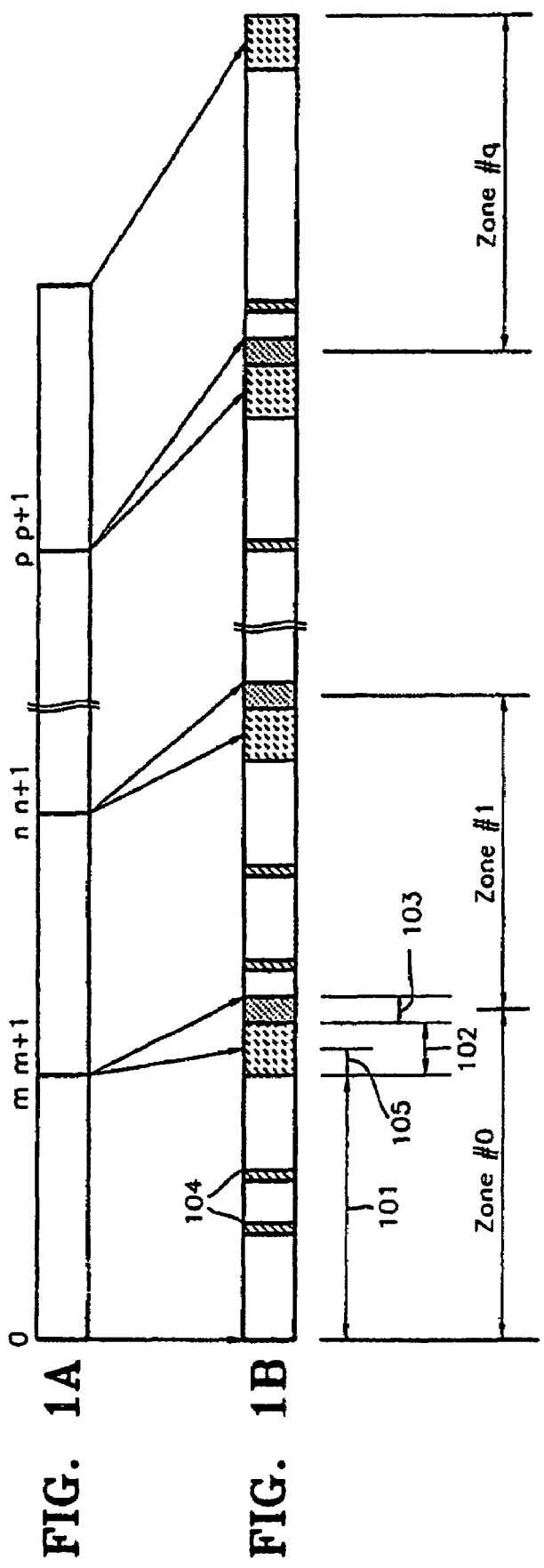

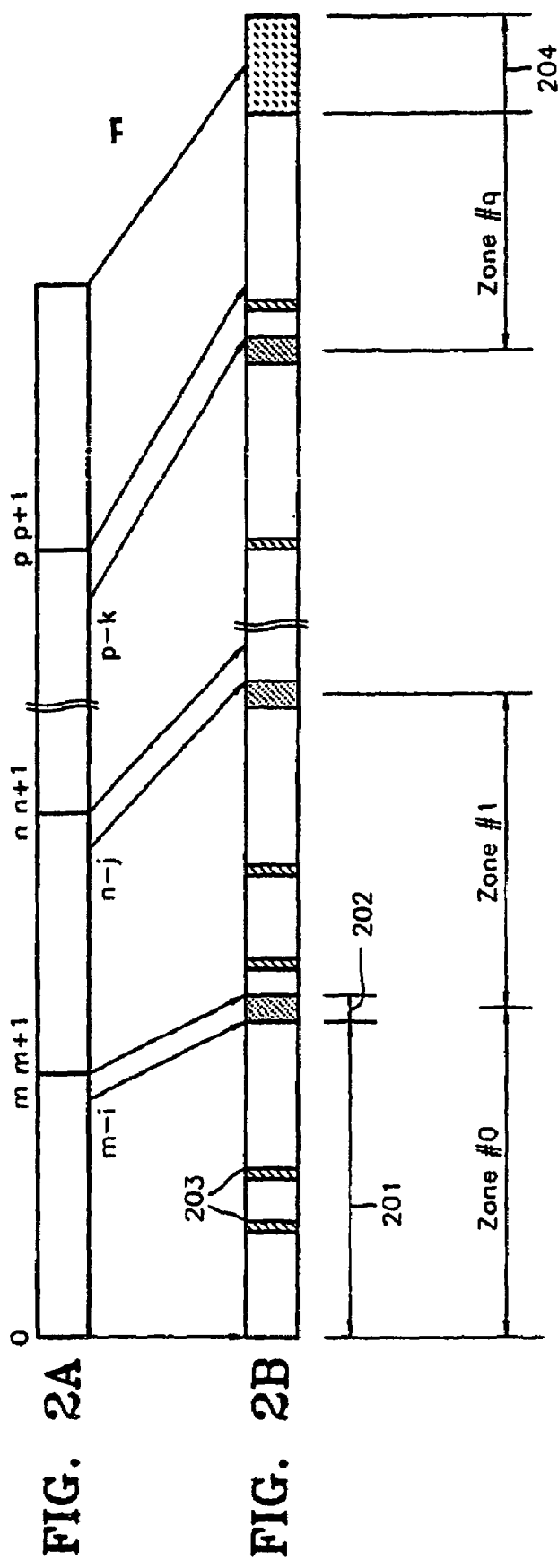

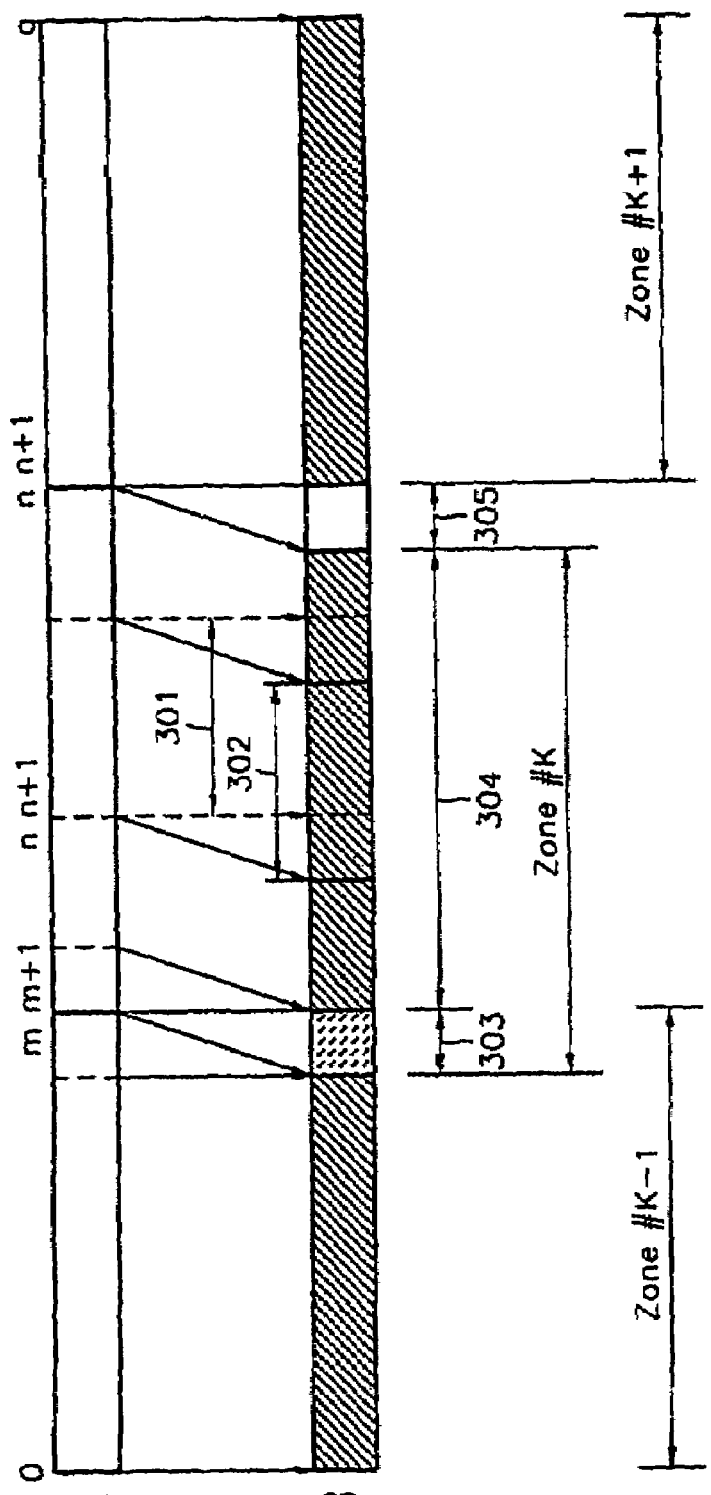

FIG. 4A
| RBP | CONTENTS | NUMBER OF BYTES |
|---|---|---|
| 0 TO 3 | START SECTOR NUMBER FOR ZONE 0 | 4 BYTES |
| 4 TO 7 | START SECTOR NUMBER FOR ZONE 1 | 4 BYTES |
| ... | ... | ... |
| 136 TO 139 | START SECTOR NUMBER FOR ZONE 34 | 4 BYTES |
FIG. 4B
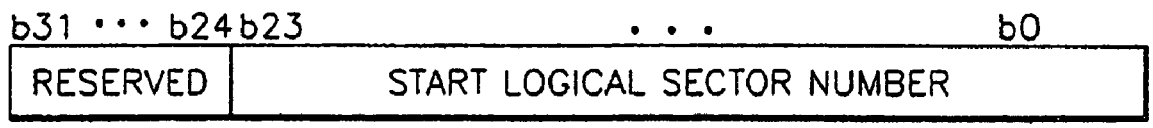
FIG. 5
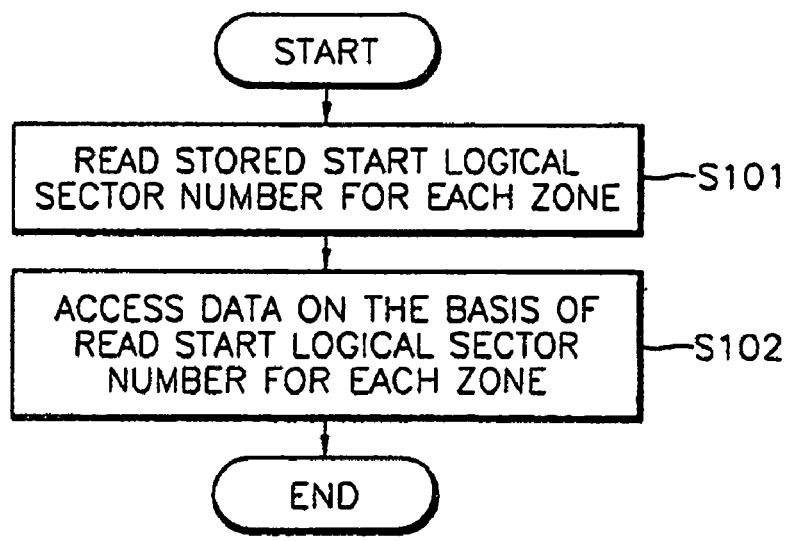

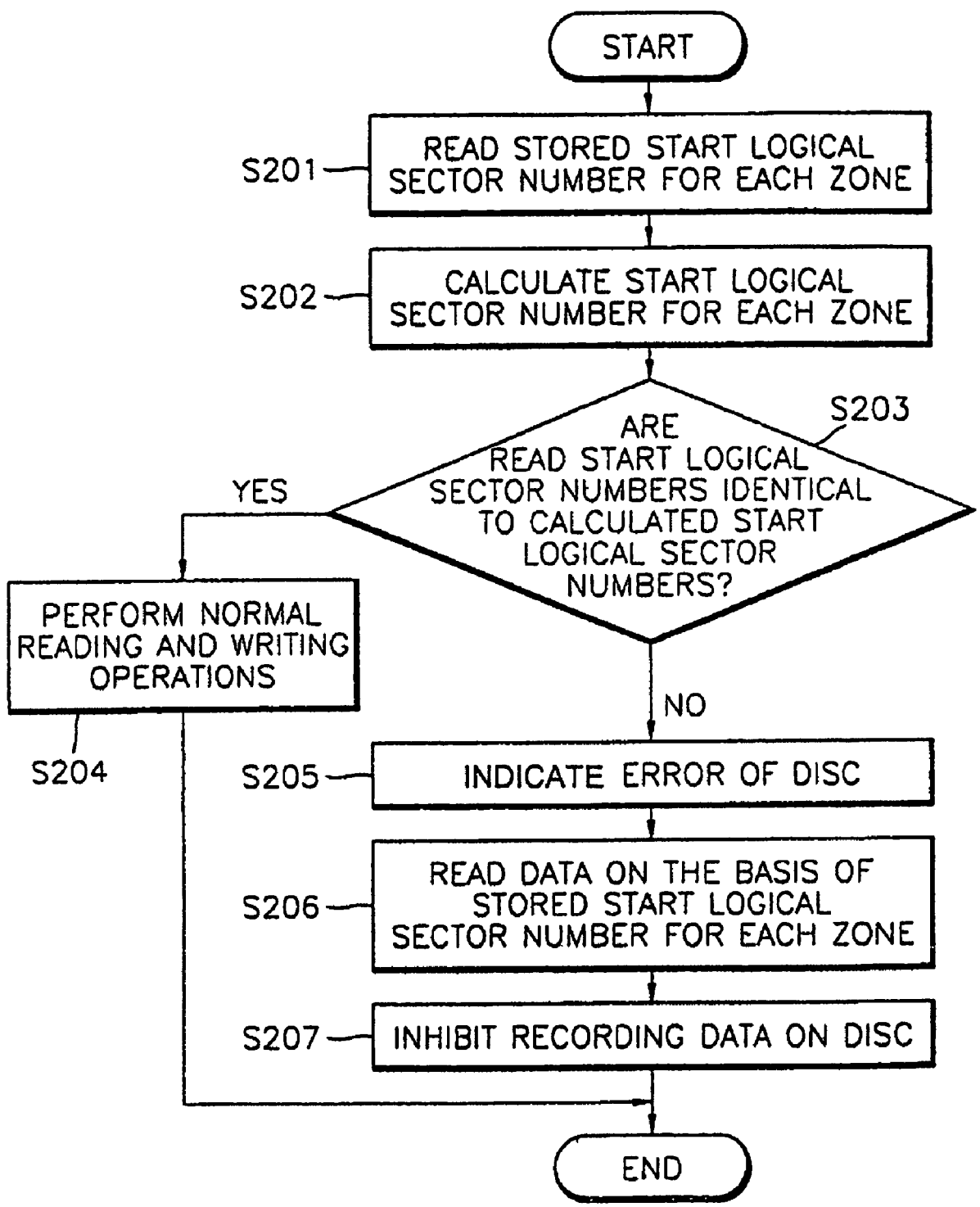

RECORDING MEDIUM FOR STORING START POSITION INFORMATION FOR EACH ZONE AND METHOD OF MANAGING DATA USING THE INFORMATION

CROSS-REFERENCE TO RELATED APPLICATIONS

This application is a continuation of application Ser. No. 10/681,250, filed Oct. 9, 2003, currently pending, which is a continuation of application Ser. No. 09/474,748, filed Dec. 29, 1999, which issued as U.S. Pat. No. 6,725,400, which claims the benefit of Korean Application No. 98-61603, filed Dec. 30, 1998, in the Korean Patent Office, the disclosures of which are incorporated herein by reference.

BACKGROUND OF THE INVENTION

1. Field of the Invention

The present invention relates to the field of optical recording media, and more particularly, to a disc for storing information of start positions for each zone after initialization or reinitialization of the recording medium, which has a spare area for defect management of a group formed of a plurality of zones, and to a method of managing data using the information.

2. Description of the Related Art

A disc is divided into zones so that inexactness of recording due to a change in speed of a spindle and deterioration of a search speed, which occur in a constant linear velocity (CLV) method are suppressed, and a zoned constant linear velocity (ZCLV) method is used to obtain a higher recording density than that obtained by a constant angular velocity (CAV) method.

A recordable and/or rewritable disc managed by a predetermined method of managing defects may have a defective area, which can be detected through a certification process, when the disc is initialized. In order to manage the defects, physical sector numbers for indicating physical position on the disc and logical sector numbers for recording and managing a file by a file system, are separately managed. Logical sector numbers are sequentially given to record and reproduce a file by a file system, in areas other than areas which are for recording a file, such as a lead-in area or a guard area for adjusting the change of speed at a boundary between zones, and an area where defects are generated. A file is recorded on a disc and reproduced from the disc using logical sector numbers according to the file system, and a recording and/or reproducing apparatus receives a logical sector number from the file system as a position to be recorded and/or reproduced, and then searches for a physical sector number corresponding to the logical sector number to perform recording and/or reproduction.

When a reproducing apparatus or a recording apparatus makes an error in calculation of the logical sector number, the file is recorded in a physically wrong area, so that the file cannot be read by another reproducing apparatus. Also, the file overlaps with previous recorded data, so that the previous recorded data is spoiled.

SUMMARY OF THE INVENTION

To solve the above problems, it is an object of the present invention to provide a recording medium which is divided into a plurality of zones by a method of controlling the speed for each zone such as a zoned constant linear velocity or a zoned constant angular velocity, and information on the start position of each zone is stored after initialization or reinitialization of the recording medium which forms a group from a plurality of zones and has a spare area for defect management.

It is another object of the present invention to provide a method of managing data on the basis of the start position information of each zone recorded on the disc, to minimize damage of data due to errors in calculation of the start logical sector number generated by recording and/or reproducing apparatuses which are different from each other and ensure stable recording and/or reproducing of data.

Additional objects and advantages of the invention will be set forth in part in the description which follows and, in part, will be obvious from the description, or may be learned by practice of the invention.

Accordingly, to achieve the first object of the present invention, there is provided a recording medium comprised of a plurality of zones in order to manage defects, wherein the plurality of zones form a group, and a spare area for replacing defects for the group is allocated, and start position information for each zone is stored in a predetermined area.

To achieve the second object of the present invention, there is provided a method of managing data for a reproducing only apparatus in which a plurality of zones form a group to manage defects of the disc, a spare area for replacing defects for the group is allocated, and start position information for each zone is stored in a predetermined area, comprising the steps of: reading start position information, which is stored in the predetermined area, for each zone; and accessing data on the basis of the read start position information and reproducing the accessed data.

To further achieve the second object of the present invention, there is provided a method of managing data for a recording and reproducing apparatus in which a plurality of zones forms a group to manage defects of the disc, a spare area for replacing defects of the group is allocated, and the start position information for each zone is stored in a predetermined area, comprising the steps of: reading the start position information for each zone, which is stored in the defect management area; calculating the start position information for each zone on the basis of primary defect list information; and performing reading and writing of data when the read start position information is identical to the calculated start position information.

Also, the method further comprises the step of reading the data on the basis of the start position information stored in the predetermined area when the read start position information is not identical to the calculated start position information.

BRIEF DESCRIPTION OF THE DRAWINGS

The above objects and advantages of the present invention will become more apparent by describing in detail preferred embodiments thereof with reference to the attached drawings, in which:

FIG. 1 shows the relationship between a one-dimensional structure of a disc having a size of the DVD-RAM standard version 1.0 and a start logical number of each zone;

FIGS. 2A and 2B show a change of a start logical sector number of each zone caused by slipping replacement in the disc, which has a group formed of a plurality of zones;

FIGS. 3A and 3B show a change of the starting position of data which is recorded by the miscalculated logical sector number in the structure of the disc of FIGS. 2A and 2B;

FIGS. 4A and 4B show an example of the structure of a table which includes information on the start position for each zone in a defect management area according to the present invention;

FIG. 5 is a flowchart of a data management method of a reproducing only apparatus according to an embodiment of the present invention; and FIG. 6 is a flowchart of a data management method of a recording and reproducing apparatus according to an embodiment of the present invention.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In order to manage defects on a general recordable and/or rewritable disc, slipping replacement, for skipping defects without providing logical sector numbers to the defects, is used for defects (primary defects) generated upon initialization of the disc, and linear replacement for replacing error correction code (ECC) blocks of an erroneous zone with normal blocks in a spare area, is used for defects (secondary defects) generated during use of the disc.

That is, slipping replacement is used to minimize a reduction in the recording or reproduction speed due to defects, in which a logical sector number is provided to a sector which is determined to be defective during a certification process for inspecting defects of a disc when the disc is initialized. Here, the logical sector number is provided to a sector next to the defective sector, that is, data is recorded or reproduced by skipping a sector where a defect is generated during recording or reproduction. Here, an actual physical sector number is shifted by the sector number designated by skipping the defective sector. Such a shifting-backwards phenomenon is solved by using the same number of sectors in a spare area located at the end portion of a recording area (a group or a zone) as the number of defects in the recording area. According to the specifications, the position of a defective sector replaced by slipping replacement is prescribed to be recorded in a primary defect list (PDL) in a defect management area (DMA) on a disc.

Slipping replacement cannot be used for a defect which is generated while a disc is being used. When a defective portion is disregarded or skipped, discontinuity is introduced into the logical sector numbering, which means that slipping replacement violates file system rules. Thus, linear replacement is used for defects generated during use of the disc, in which an ECC block including a defective sector is replaced by an ECC block existing in a spare area. The location of the defective ECC block replaced by linear replacement is prescribed to be recorded in a secondary defect list (SDL) in defect management area on a disc. When linear replacement is used, logical sector numbering is not interrupted. However, when there is a defect, the positions of sectors on a disc are discontinuous, and real data for a defective ECC block exists in a spare area.

Meanwhile, a digital versatile disc random access memory (DVD-RAM) according to the DVD-RAM standard version 1.0 includes a plurality of groups each having a user area and a spare area. That is, FIGS. 1A and 1B one-dimensionally show a logical area and a physical area on part of a disc, respectively, where each zone of the physical area includes a guard area, a user area, a spare area, and a guard area which are sequentially arranged. In FIG. 1A, the letters m, m+1, n, n+1, p, and p+1 represent the end logical sector number of a first zone, the start logical sector number of a second zone, the end logical sector number of the second zone, the start logical sector number of a zone immediately before the last zone, and the first logical sector number of the last zone, respectively, when there are no defects. That is, reference numerals 101, 102, 103, 104 and 105 denote a user area, a spare area, a guard area, defective sectors and a spare area replaced by slipping replacement, respectively. The guard area 103 is a buffering area for preventing driving from becoming unstable due to the differences in rotation speed between zones, and is allocated at the start and the end positions of each zone. The spare area 102 of FIG. 1B indicates a spare area of a predetermined size allocated by a standard. The spare area 102 is constant in each zone. Also, the spare area 105 indicates a portion of the spare area 102 which is already used by slipping replacement due to defective sectors 104.

In a conventional method for managing defects, a group is formed of one zone, and a spare area is allocated at the end of each group. Each group is managed as a defect management area. Also, FIG. 1B shows the shifting-backwards phenomenon in which a logical sector number is shifted backwards by slipping replacement. However, when spare areas are arranged in each zone, the shifting phenomenon of a logical sector number ends at the spare area of the corresponding zone and the start logical sector number of the next zone is predetermined without being affected by the number of defects as shown in FIG. 1A. Thus, the start logical sector numbers of each of the groups are predetermined by a standard so that when data on the disc is read, the start logical sector numbers for each group may not be separately managed to search for the corresponding group.

However, the start logical sector number of each group is designated as described above. Thus, when defects in a group are managed by slipping replacement, slipping replacement must be performed only within a corresponding group. In order to replace defects generated in a corresponding group using the slipping replacement, the number of defective sectors that are slipped must be less than the number of usable sectors in a spare area of the corresponding group. Thus, a restriction that a large defect generated in a group must be processed within the same group limits the maximum size of a defect that can be replaced by slipping replacement.

If the size of defects to be replaced by slipping replacement is greater than the size of a spare area in a corresponding group, a spare area in another group must be used by linear replacement. However, when linear replacement is used, defects are managed not in units of sectors but in units of ECC blocks, that is, in units of 16 sectors. Thus, a spare area of 16 sectors is required to process one defective sector, which degrades the efficiency of defect management. Also, a standard size of a spare area for defect management is predetermined, so that a spare area of the predetermined size must also be allocated in applications to which defect management using linear replacement cannot be applied, such as real time recording. Therefore, the efficiency of area utilization of a disc is degraded.

To solve these problems, there is proposed a method of managing defects in which a group is formed of a plurality of zones and a spare area is allocated at the start portion of the group and/or the end thereof.

When a group is formed of a plurality of zones, the start logical sector number for each zone depends on the number of defects. Particularly, when a spare area exists at the position in which the group starts, the slipping replacement must be performed backwards, to thereby complicate calculation in initialization. Particularly, slipping replacement causes misalignment of the start sector of an ECC block at a start position of a zone, so that a fragmented ECC block is located at the zone boundary. When sectors which cannot form an ECC block at a boundary between zones are skipped to prevent the fragmented ECC blocks of each zone, calculation of the start logical sector number with respect to each zone becomes more complicated.

That is, FIGS. 2A and 2B show a logical area and a physical area of a disc, respectively, in which a plurality of zones form a group, a spare area for slipping replacement is allocated at the group, and the start logical sector number of each zone is changed. Each zone includes a guard area, a user area, and a guard area, and a spare area 204 for a group is allocated at the end portion of the group. Reference numerals 201, 202 and 203 denote a user area, a guard area and defective sectors, respectively.

When a zone #0 (first zone) has no defects, the logical sector number which is allocated as the start logical sector number of a zone #1 (the second zone) is m+1, and when there are no defects, the start logical sector number of a third zone is n+1, and when a defect is generated in each zone during initialization, the start logical sector number is shifted backwards by an amount equal to the number of the defective sectors.

That is, as shown in FIG. 2B, when the number of defective sectors in the zone #0 is i, the logical sector numbers are shifted backwards by i. If there are no defects, as shown in FIG. 2A, the final logical sector number allocated to the zone #0 is m, however, the final logical sector number allocated to the first zone according to the number i of defective sectors is m-i.

Thus, in the DVD-RAM standard version 1.0, when the size of a user area allocated to the first zone is m sectors, the start logical sector number of the zone #1 starts from m+1, but when each zone has no spare area, the start logical sector number of the next zone is shifted by i as shown in FIG. 2B so that the start logical sector number of the zone #1 is m-i+1.

In the next zone (zone #2), when the number of defects generated from the start of the group to the same zone (zone #2) is j, the start logical sector number is shifted to n-j+1. At this time, i and j may further include unused sectors for preventing the start position of the ECC block from misaligning at each boundary between each zone due to a defective sector, i.e., for skipping the remaining sectors which cannot form an ECC block at the end of each zone. Thus, the start logical sector number for each zone is shifted backwards by the additional spare area.

Here, the spare area 204 may be allocated at the end portion of a group or the start portion thereof. When the spare area 204 is allocated at the start portion of group, reverse slipping replacement is performed, which complicates calculation of the start logical sector number for each zone. In reverse slipping replacement, the slipping replacement is performed in reverse and the remaining sectors which cannot form an ECC block, which are generated at a boundary between zones after the slipping replacement, are reallocated at the final portion of the zone, which complicates calculation.

Also, when the file system is generally recorded at a portion where the logical sector number of the disc starts, the spare area is positioned at the start portion of the group, and the calculation is wrong, the file system cannot be read due to the forward shifting of the logical sector number.

Thus, when defects are managed in the group forming a plurality of zones, the start logical sector number for each zone is changed so that the recording and/or reproducing apparatus must calculate the start logical sector number for each zone to perform normally recording and/or reproduction of data on/from a disc. Meanwhile, in order to read the disc in a reproducing only apparatus such as DVD-ROM reproducing apparatus and/or a DVD player, the start logical sector numbers for each zone of the disc must be read, so that the size of the firmware of the reproducing apparatus is increased.

FIGS. 3A and 3B show the case of change of the start logical sector number of a zone when a complicated start logical sector number is wrongly calculated in a predetermined portion due to errors in designing a recording and/or reproducing apparatus or a software bug of a firmware. When the calculation of the logical start positions of zones is complicated, and thus calculation of the start logical sector of zones is wrong in a predetermined portion due to errors of software of a microcomputer which controls initialization of the reproducing apparatus, a normal position of the physical area shown in FIG. 3B corresponding to a position of the logical area of the file in a zone #K shown in FIG. 3A, which is 301, may be 302.

As shown in FIG. 3B, a zone 303 where logical sector numbers overlap, a zone 304 where the logical sector number is wrong, or a zone 305 where the logical sector number is not designated, may be generated. In particular, zones 303 and 305 can be easily found, but zone 304 cannot be easily found by any corresponding reproducing apparatus. In the drive system having a wrong calculation, wrong positions may be recorded or a normally recorded portion cannot be read due to the wrong calculation of the start logical sector number.

When the file is abnormally recorded, and a wrong recorded disc is recorded and/or reproduced wrongly in a normal recording and/or reproducing apparatus, or a normally recorded disc is managed in a recording and/or reproducing apparatus in which the start logical sector number is wrongly calculated, the file may be wrongly read and written. In particular, when the defect management area is allocated to the start position of the group, slipping replacement is performed in reverse so that the first position of the logical sector number may be wrong, where the file system cannot be read.

To solve the above problem, when the start logical sector numbers for each zone are determined after slipping replacement on initialization or reinitialization, the start logical sector numbers for each zone are stored in a disc definition structure (DDS) area of the defect management area. That is, as shown in FIG. 4A, the start logical sector numbers for each zone are recorded in the DDS area using a recording item of 4 bytes. Here, RBP shows a relative byte position, and start logical sector numbers for 35 zones from a reserved 256th byte position of the DDS area can be allocated in unit of 4 bytes, as an example. FIG. 4B denotes the structure of the DDS where the start logical sector numbers of 4 bytes for each zone are stored, where the start logical sector numbers are recorded in 24 bits and the remaining bits are reserved.

When a disc on which the start logical sector numbers for each zone are recorded is read or written in another recording and/or reproducing apparatus, the following operations may be performed.

The reproducing only apparatus requires no calculation of the start logical sector numbers. This is because the recording and/or reproducing apparatus records data on the basis of the wrong start logical sector number even though the start logical sector number recorded in the DDS area is wrong, and thus the reproducing only apparatus must read data on the basis of the stored start logical sector number. Thus, it is most secure to read data with reference to the start logical sector number recorded in the DDS area without complicated calculation and regardless of wrong calculation of the start logical sector number recorded in the DDS area. Thus, the reproducing apparatus requires no algorithm for calculating the complicated start logical sector number to thereby simplify the firmware.

That is, in the reproducing only apparatus, as shown in the flowchart of FIG. 5, the start logical sector number for each zone stored in the DDS area is read (S101), and data is accessed based on the read start logical sector number to be produced (S102).

Meanwhile, when the disc is installed in a recording and reproducing apparatus, the start logical sector number of the DDS area is read, but the start logical sector number is calculated on the basis of PDL information of the defect management area. If the recorded information is consistent with the information obtained by calculation, the apparatus performs normal recording and reproduction, and if not, the apparatus only reads data on the basis of the start logical sector information recorded on the disc. This is because the data of the disc is recorded on the basis of the start logical sector number which is stored in the DDS area for each zone. Also, it is most secure not to record additional data until it is determined which information is wrong. Thus, information must not be recorded on the disc until it is determined why the start logical sector number of the disc is inconsistent and a proper action is performed.

That is, in the recording and reproducing apparatus, as shown in the flowchart of FIG. 6, the start logical sector number for each zone stored in the DDS area is read (S201), and the start logical sector number for each zone is calculated on the basis of the PDL information of the defect management area (S202). Then, it is determined whether the start logical sector numbers read in step 201 are identical to the start logical sector numbers calculated in step 202 (S203), and if so, normal data read and write operations are performed (S204). If not, the fact that the disc has an error is indicated to a user (S205), data is read on the basis of the start logical sector number stored in the DDS area (S206), and no data is recorded on the disc until the error is cleared by a fixing tool (S207).

As described above, the start logical sector number corresponding to the start position information for each zone is stored in the defect management area so that the reproducing only apparatus requires no algorithm to calculate the complicated start logical sector number.

Also, when the stored information is inconsistent with the corresponding calculated start position information for each zone, damage of data due to errors of calculation of the start logical sector number generated by recording and reproducing apparatuses which are different from each other, using the stored start position information for each zone, is minimized and stability of the recorded data is increased.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording to a recording medium comprising a data area having a plurality of zones; a spare area disposed in an area other than the zones of the data area; and an information area for each zone, the method comprising:
   calculating a start position for each zone after slipping replacement is performed to reflect a number of defective areas detected during the slipping replacement;
   recording the calculated start position as start position information in the information area; and
   performing defect management with respect to data recorded in the zone by recording replacement data in the spare area for defective areas of zones of the data area.

2. The method of claim 1, wherein the information area is a disc definition structure area of a defect management area of the recording medium in which the start position information for each zone is stored.

3. The method of claim 1, wherein, for each of the plurality of zones, the start position recorded in the start position information is different.

4. The method of claim 1, wherein the spare area is at an end of the plurality of the zones to record replacement data for defective areas of zones of the data area.

5. The method of claim 1, wherein the start position for each zone is calculated after slipping replacement is performed to reflect a number of replacements being made during the slipping replacement.

6. The method of claim 5, wherein the information area is a disc definition structure area of a defect management area of the recording medium in which the start position information for each zone is stored.

7. The method of claim 5, wherein the start position stored in the information area is calculated after slipping replacement is performed during initialization and/or re-initialization and prior to being stored in the information area.

8. The method of claim 5, wherein each start position is determined with reference to a number of defects generated from a start of the data area up to a preceding zone during the slipping replacement.

9. The method of claim 8, wherein the start position stored in the information area is calculated after the slipping replacement is performed during initialization and/or re-initialization and prior to being stored in the information area.

10. The method of claim 1, wherein defective areas detected after slipping replacement are replaced by replacement areas in the spare area.

11. A method of reproducing from a recording medium comprising a data area having a plurality of zones; a spare area disposed in an area other than the zones of the data area; and an information area for each zone, the method comprising
   checking the information area, which comprises start position information having start positions for the plurality of zones, each of the start positions corresponding to one of the zones and being determined to reflect a number of defective areas detected during slipping replacement;
   reproducing the start position information from the information area; and
   reproducing replacement data recorded in the spare area which is reserved for a defective area.

12. The method of claim 11, wherein, for each of the plurality of zones, the start position recorded in the start position information is different.

13. The method of claim 11, wherein the spare area is disposed in the area other than the zones of the data area to replace defective areas in the zones.

14. The method of claim 11, wherein the spare area is at an end of the plurality of the zones to record replacement data for defective areas of zones of the data area.

15. A method of recording to a recording medium comprising a data area having a plurality of zones; a spare area; and an information area, the method comprising
   reading, from the information area, start position information for each zone which includes a start logical sector number for controlling access to data recorded on the recording medium;

recording data to one of the zones of the data area detected according to the read start position information; and performing defect management with respect to data recorded in the zone by recording replacement data in the spare area for defective areas of zones of the data area, wherein the start logical sector number is stored in a disc definition structure area of a defect management area of the recording medium, and the start logical sector number for each zone is calculated after slipping replacement is performed to reflect a number of replacements being made during the slipping replacement.

16. The method of claim 15, wherein the spare area is at an end of the plurality of the zones to record replacement data for defective areas of zones of the data area.

17. The method of claim 16, wherein the end is at a point prior to a first one of the zones.

18. The method of claim 16, wherein the end is at a point after a last one of the zones.

19. The method of claim 15, wherein each start logical sector number is determined with reference to a number of defects generated from a start of the data area up to a preceding zone during the slipping replacement.

* * * * *

UNITED STATES PATENT AND TRADEMARK OFFICE
CERTIFICATE OF CORRECTION

| | |
|---|---|
| PATENT NO. | : 7,421,622 B2 |
| APPLICATION NO. | : 11/430120 |
| DATED | : September 2, 2008 |
| INVENTOR(S) | : Jung-wan Ko |

It is certified that error appears in the above-identified patent and that said Letters Patent is hereby corrected as shown below:

Title Page, Item (56) References Cited, Other Publications, insert
--U.S. Appl. No. 12/041,814, filed Mar. 4, 2008, Jung-wan Ko, Samsung Electronics Co., Ltd.--.

Signed and Sealed this

Fourth Day of November, 2008

JON W. DUDAS
*Director of the United States Patent and Trademark Office*